United States Patent
Chen

(10) Patent No.: US 9,253,694 B2
(45) Date of Patent: Feb. 2, 2016

(54) METHODS FOR SCANNING NEIGHBOR BASE STATIONS AND COMMUNICATION APPARATUSES UTILIZING THE SAME

(75) Inventor: Yih-Shen Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 541 days.

(21) Appl. No.: 12/498,510

(22) Filed: Jul. 7, 2009

(65) Prior Publication Data

US 2010/0003986 A1 Jan. 7, 2010

Related U.S. Application Data

(60) Provisional application No. 61/078,542, filed on Jul. 7, 2008.

(51) Int. Cl.
*H04Q 7/00* (2006.01)
*H04W 60/00* (2009.01)
*H04W 36/00* (2009.01)

(52) U.S. Cl.
CPC .................................. *H04W 36/0088* (2013.01)

(58) Field of Classification Search
USPC ........... 455/436, 456.1, 466, 433, 550.1, 434; 370/322, 338, 331
See application file for complete search history.

(56) References Cited

U.S. PATENT DOCUMENTS

| | | | | |
|---|---|---|---|---|
| 5,920,549 A | * | 7/1999 | Bruckert | H04W 36/0083 370/331 |
| 6,173,181 B1 | | 1/2001 | Losh | |
| 6,983,149 B2 | | 1/2006 | Lindquist et al. | |
| 8,160,026 B2 | | 4/2012 | Son et al. | |
| 8,977,310 B2 | * | 3/2015 | Logalbo | H04W 8/186 370/466 |
| 2003/0078043 A1 | * | 4/2003 | Horwath et al. | 455/436 |
| 2003/0148774 A1 | * | 8/2003 | Naghian et al. | 455/456 |
| 2004/0131037 A1 | * | 7/2004 | Balletti et al. | 370/338 |
| 2004/0235478 A1 | * | 11/2004 | Lindquist et al. | 455/440 |
| 2005/0009531 A1 | | 1/2005 | Lindquist et al. | |
| 2005/0059395 A1 | * | 3/2005 | Park | 455/434 |
| 2005/0101326 A1 | * | 5/2005 | Kang et al. | 455/436 |
| 2005/0250499 A1 | | 11/2005 | Lee et al. | |
| 2006/0092872 A1 | | 5/2006 | Lee et al. | |
| 2006/0111111 A1 | * | 5/2006 | Ovadia | 455/439 |

(Continued)

FOREIGN PATENT DOCUMENTS

| | | |
|---|---|---|
| CN | 1278390 | 12/2000 |
| CN | 1589582 | 3/2005 |

(Continued)

OTHER PUBLICATIONS

English language translation of abstract of CN 1278390 (published Dec. 27, 2000).

(Continued)

*Primary Examiner* — Kent Chang
*Assistant Examiner* — William Lu
(74) *Attorney, Agent, or Firm* — McClure, Qualey & Rodack, LLP

(57) ABSTRACT

A communication apparatus is provided. The communication apparatus includes a radio transceiver module and a processor. The processor receives a neighbor cell advertisement message from a serving base station via the radio transceiver module and scans neighbor base stations according to information carried in the neighbor cell advertisement message to obtain a measurement result. The neighbor base stations are scanned in a prioritized order.

19 Claims, 9 Drawing Sheets

(56) References Cited

U.S. PATENT DOCUMENTS

| | | | |
|---|---|---|---|
| 2007/0105585 A1 | 5/2007 | Lee et al. | |
| 2007/0105586 A1 | 5/2007 | Kim et al. | |
| 2008/0095120 A1* | 4/2008 | Hong et al. | 370/332 |
| 2008/0219216 A1 | 9/2008 | Taaghol et al. | |
| 2008/0225797 A1* | 9/2008 | Kim | 370/331 |
| 2008/0318576 A1* | 12/2008 | So | H04W 36/0066 455/436 |
| 2009/0047958 A1* | 2/2009 | Rimhagen et al. | 455/436 |
| 2009/0196265 A1* | 8/2009 | Nieves et al. | 370/338 |
| 2009/0239533 A1* | 9/2009 | Somasundaram | H04J 11/0093 455/434 |

FOREIGN PATENT DOCUMENTS

| | | |
|---|---|---|
| CN | 1794865 | 6/2006 |
| CN | 1965603 | 5/2007 |
| EP | 1 976 323 | 1/2008 |
| JP | 2004349976 | 12/2004 |
| JP | 2007-509527 | 4/2007 |
| JP | 2007228242 | 9/2007 |
| JP | 2007-536786 | 12/2007 |

OTHER PUBLICATIONS

English language translation of abstract of CN 1589582 (published Mar. 2, 2005).

Full English (machine) translation for CN1794865 (Published Jun. 28, 2006).

Full English (machine) translation for CN1965603 (Published May 16, 2007).

Draft IEEE Standard for Local and Metropolitan Area Networks; "Part 16: Air Interface for Fixed and Mobile Broadband Wireless Access Systems; Amendment for Physical and Medium Access Control Layers for Combined Fixed and Mobile Operation in Licensed Bands;" 2. IEEE p802.16e/D5; Sep. 2004; pp. 1-25.

English language translation of abstract of JP 2004349976 (published Dec. 9, 2004).

English language translation of abstract of JP 2007228242 (published Sep. 6, 2007).

"Enhancements on Neighbor Advertisement Message;"; Aug. 27, 2004; pp. 1-7.

* cited by examiner

METHODS FOR SCANNING NEIGHBOR BASE STATIONS AND COMMUNICATION APPARATUSES UTILIZING THE SAME

CROSS REFERENCE TO RELATED APPLICATIONS

This application claims the benefit of U.S. Provisional Application No. 61/078,542 filed Jul. 7, 2008 and entitled "CELL SCANNING SCHEME FOR WIRELESS OFDMA SYSTEM". The entire contents of which are hereby incorporated by reference.

BACKGROUND OF THE INVENTION

1. Field of the Invention

The invention relates to a method for scanning neighbor base stations of a communication apparatus, and more particularly to a method for scanning of neighbor base stations of a communication apparatus according to a prioritized order.

2. Description of the Related Art

Orthogonal frequency division multiplexing (OFDM) is an efficient modulation scheme for signal transmission over frequency-selective channels. In OFDM, a wide bandwidth is divided into multiple narrow-band sub-carriers, which are arranged to be orthogonal with each other. The signals modulated on the sub-carriers are transmitted in parallel. Orthogonal frequency division multiple access (OFDMA) is one way of using the basic format of OFDM to support multiple access for multiple subscribers. In OFDMA, multiple subscribers simultaneously use different sub-carriers, in a fashion similar to frequency division multiple access (FDMA).

A heterogeneous network, including at least two different cells from macro, micro, pico, and femto cells, is designed to fulfill the requirement of future communication (i.e. 4G) system. In IEEE 802.16-like system, Hierarchical Cell Structure (HCS) has been proposed, and HCS is one of the promising techniques for heterogeneous network deployment. FIG. 1 shows an exemplary communication network, constructed by cells in the hierarchical cell structure. As shown in FIG. 1, hierarchical cell structure is a multi-layered network structure with cells and base stations of overlapped geographic coverage, in which base stations within a same layer have common associations and services, and may be configured independently from the base stations in other layers. Such kind of network deployment is called a heterogeneous network deployment.

However, the heterogeneous network deployment, to a certain extent, increases difficulties when exchanging neighbor cell information between the base stations and the mobile stations due to the configuration differences between the base stations. Thus, a novel scheme for managing the neighbor cell information to further improve system performance is highly required.

BRIEF SUMMARY OF THE INVENTION

Communication apparatuses and methods for scanning of neighbor base stations of a communication apparatus are provided. An embodiment of such a communication apparatus comprises a radio transceiver module and a processor. The processor receives a neighbor cell advertisement message from a serving base station via the radio transceiver module and scans a plurality of neighbor base stations according to the information carried in the neighbor cell advertisement message to obtain a measurement result. The neighbor base stations are scanned in a prioritized order.

An embodiment of a method for scanning neighbor base stations of a communication apparatus comprises obtaining information of a plurality of neighbor base stations; determining one or more candidates of neighbor base stations to be scanned according to the obtained information, wherein the candidates are prioritized in a preferred order according to properties of the neighbor base stations; and scanning the candidates in the preferred order to obtain a measurement result.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
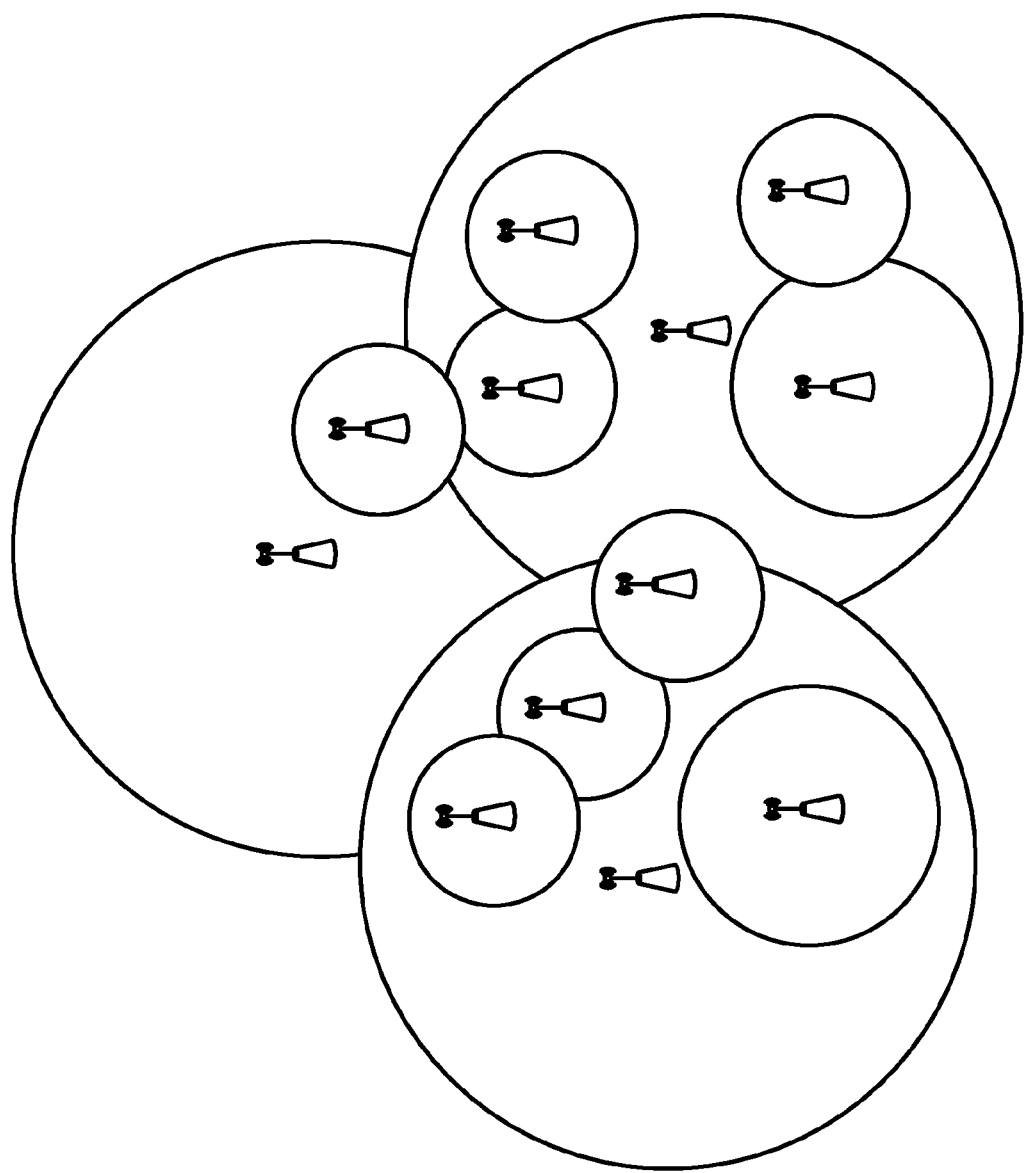
FIG. 1 shows an exemplary communication network, built up by the cells in the hierarchical cell structure.
Figure 2:
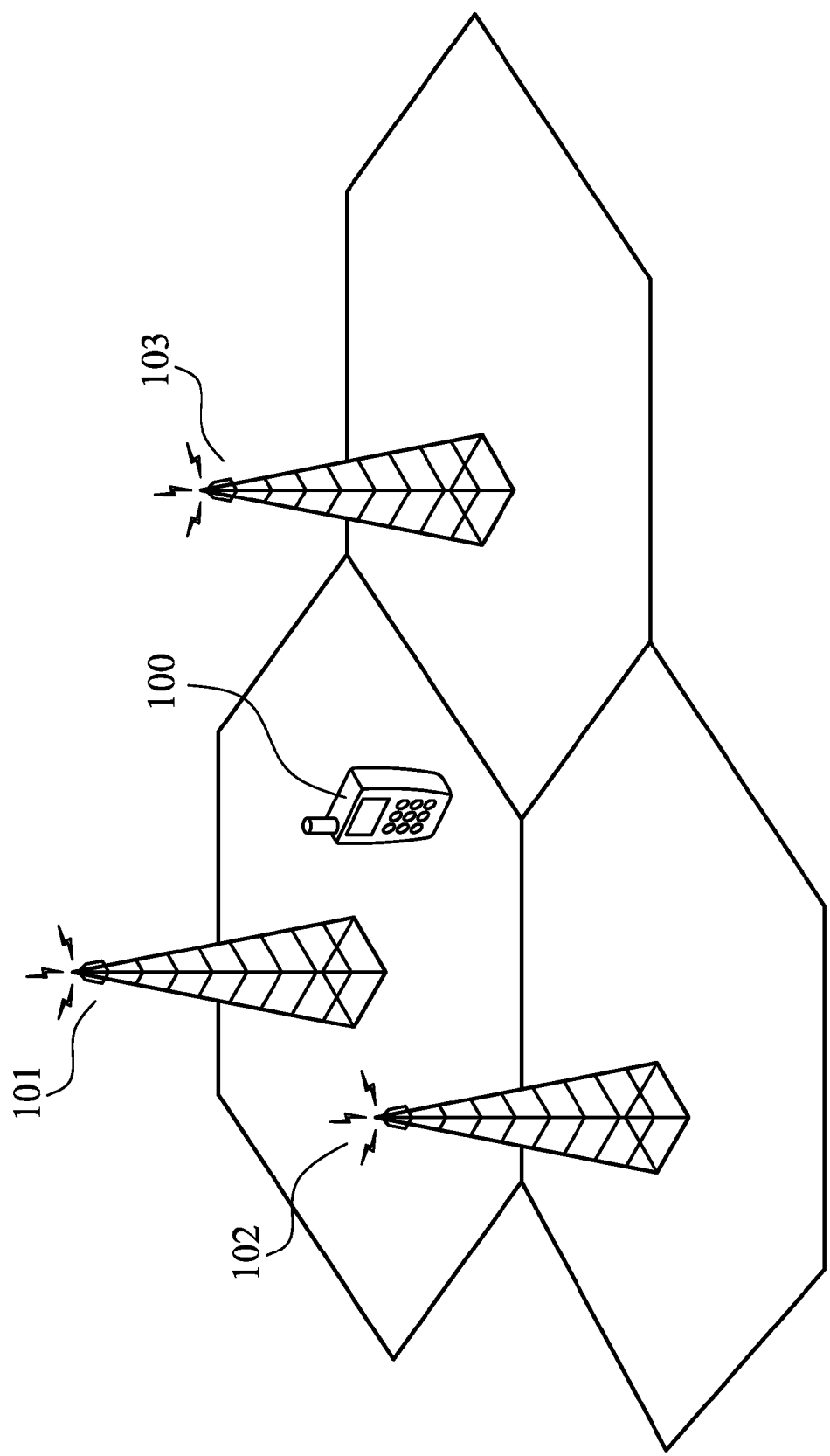
FIG. 2 shows an exemplary cellular communication network system according to an embodiment of the invention.

FIG. 2 shows an exemplary cellular communication network system according to an embodiment of the invention. The cellular communication network system comprises the communication apparatus 100 and the base stations 101, 102 and 103. The communication apparatus 100 camps on the base station 101 and uses the communication service provided by the base station 101. Thus, the base station 101 may be regarded as the serving base station of the communication apparatus 100, and the base stations 102 and 103 may be regarded as the neighbor base stations (or called neighbor cells) of the communication apparatus 100.

Figure 3:
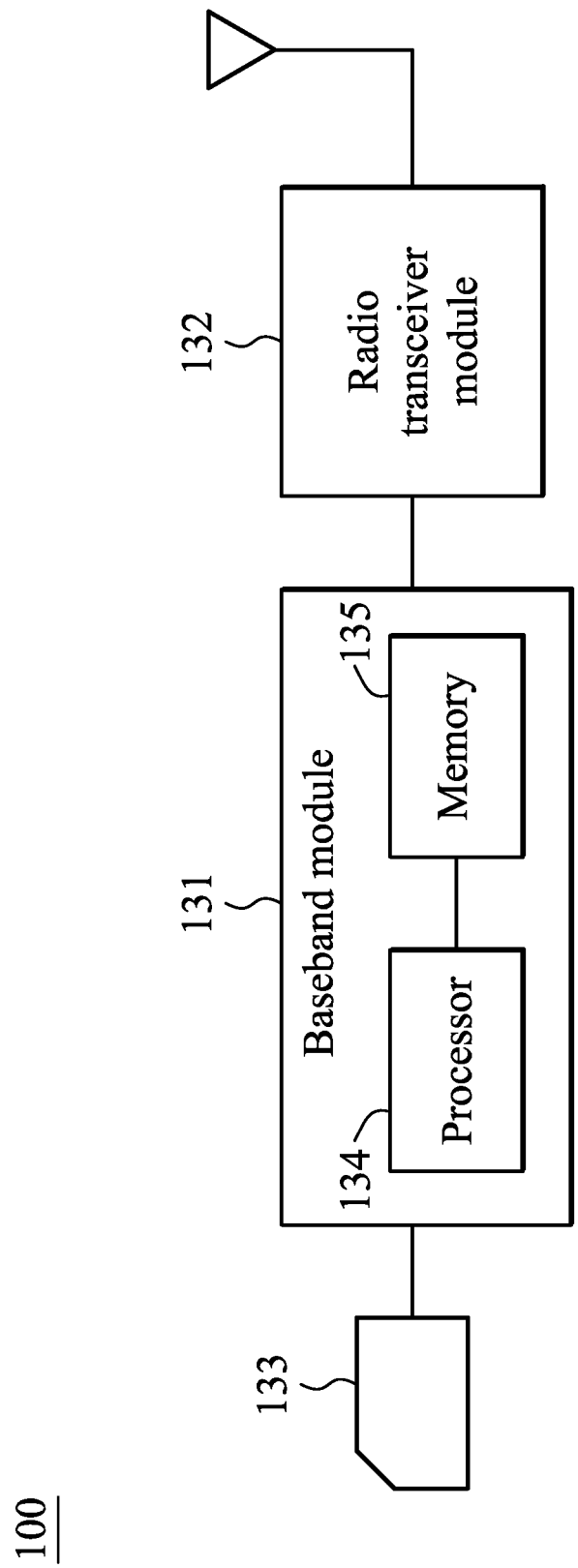
FIG. 3 shows a schematic view of a communication apparatus according to an embodiment of the invention.

FIG. 3 shows a schematic view of a communication apparatus 100 according to an embodiment of the invention. The communication apparatus 100 may comprise a baseband module 131 and a radio transceiver module 132 and selectively comprise a subscriber identity card 133. The radio transceiver module 132 receives wireless radio frequency signals, converts the received signals to baseband signals to be processed by the baseband module 131, or receives baseband signals from the baseband module 131 and converts the received signals to wireless radio frequency signals to be transmitted to a peer device. The radio transceiver module 132 may comprise a plurality of hardware devices to perform radio frequency conversion. For example, the radio transceiver module 132 may comprise a mixer to multiply the baseband signals with a carrier oscillated in the radio frequency of the cellular communication system. The baseband module 131 further converts the baseband signals to a plurality of digital signals, and processes the digital signals, and vice versa. The baseband module 131 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 131 further comprises a memory device 135 and a processor 134. The memory 135 may store a plurality of software/firmware code or instructions to maintain the operation of the communication apparatus. It is to be noted that the memory device 135 may also be configured outside of the baseband module 131 and the invention should not be limited thereto. The processor 134 executes code or the instructions stored in the memory 135 and controls the operations of the baseband module 131, the radio transceiver module 132, and the plugged subscriber identity card 133, respectively. The processor 134 may read data from the plugged subscriber identity card 133 and writes data to the plugged subscriber identity card 133. It is also to be noted that the communication apparatus 100 may also comprise another type of identity module instead of the subscriber identity card 133 and the invention should not be limited thereto.

Figure 4:
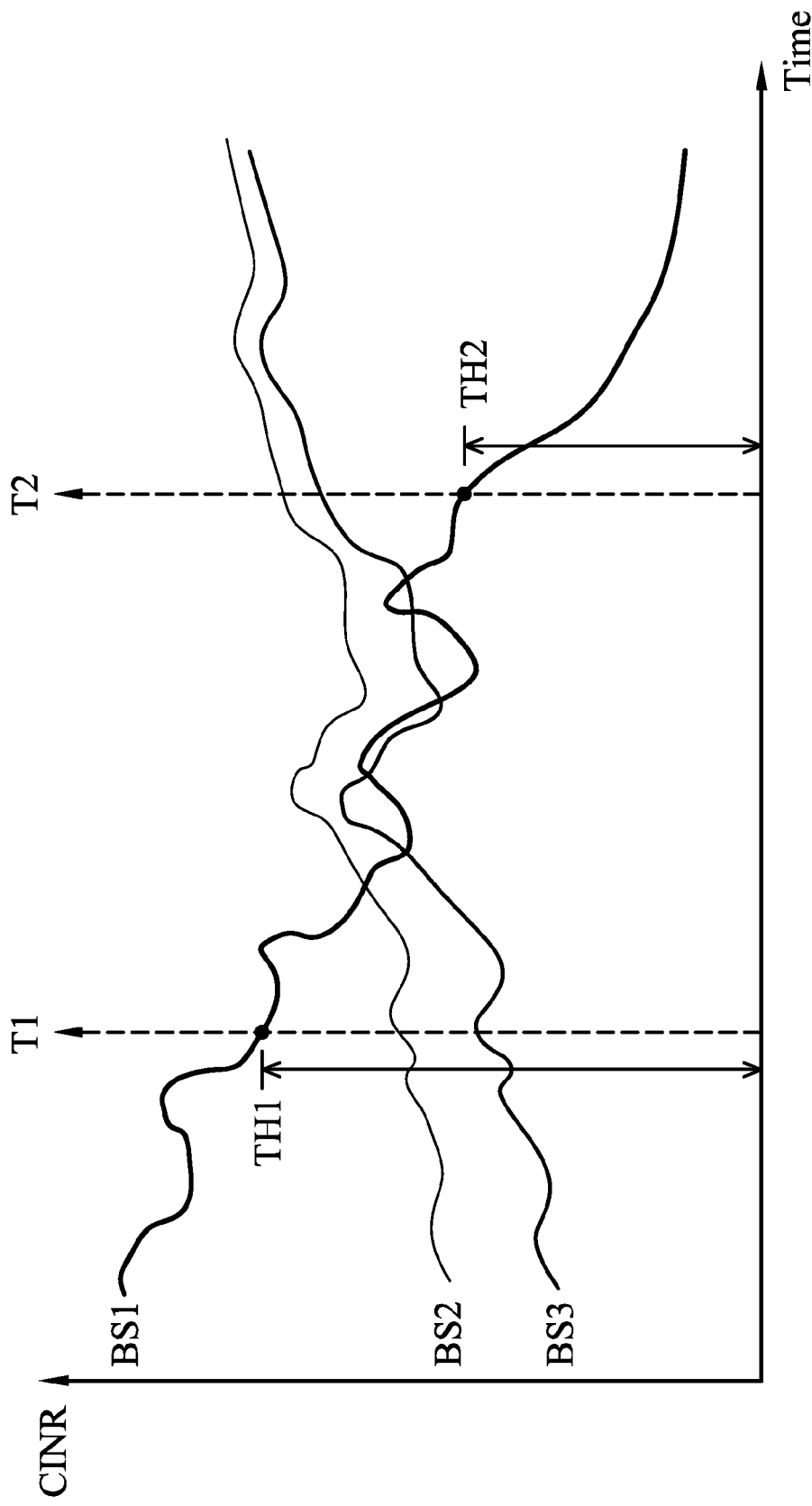
FIG. 4 is a timing diagram showing the Carrier to Interference plus Noise Ratio (CINR) curves of the base stations according to an embodiment of the invention.

The base stations 101, 102 and 103 may periodically broadcast a neighbor cell advertisement message (NBR_ADV), which carries cell information of neighbor base stations (also referred to neighbor cells), for all communication apparatus in the corresponding cell coverage. According to an embodiment of the invention, when the communication apparatus 100 is moving away from the serving base station 101, a scanning procedure for measuring the neighbor base stations may be triggered to identify a suitable target base station for a possibly handover procedure. The objective of measurement may be received signal strength (RSS), carrier to interference plus noise ratio (CINR) and round trip delay (RTD). FIG. 4 is a timing diagram showing the measured CINR curves of the base stations 101, 102 to 103 according to the embodiment of the invention. Suppose that the communication apparatus 100 is moving away from the serving base station 101 and toward the base station 102, the signal power of the base station 101 (labeled by BS1) begins to drop, while the signal power of the neighbor base stations 102 (labeled by BS2) and 103 (labeled by BS3) begin to rise. When the signal power of the base station 101 drops below a first predetermined threshold (TH1) at time T1, a scanning procedure may be triggered. A handover procedure may be triggered when the signal power of the base station 101 further drops to below a second predetermined threshold (TH2). During the time interval from T1 to T2, the communication apparatus 100 may periodically scan the neighbor base stations, identify a suitable target base station, and decide whether to transfer the communication services of the communication apparatus 100 from the current serving base station to the target base station. It is noted that in other embodiments of the invention, the decision of target base station may also be done by current serving base station.

In the conventional design, the neighbor cell advertisement message (NBR_ADV) is required to carry cell information of all neighbor base stations in aid of the scanning procedure. However, the time required for scanning all of the neighbor base stations greatly increases with the increase in the amount of the neighbor base stations. The condition is even worse in a heterogeneous network. Hierarchical Cell Structure (HCS) is a typical example of heterogeneous network, in which the base stations with different cell coverages (for example, from 30~50 m femto-cell up to 100 km macro-cell) may be deployed in the same geographic area. In this case, communications quality is degraded by higher power consumption and data transmission interruptions during the scanning procedure. Furthermore, the large overhead of the measurement report message, which is transmitted from the communication apparatus 100 to the serving base station 101, uses a larger portion of transmission bandwidth, which degrades system throughput. Therefore, an efficient cell scanning procedure is highly required.

Figure 5:
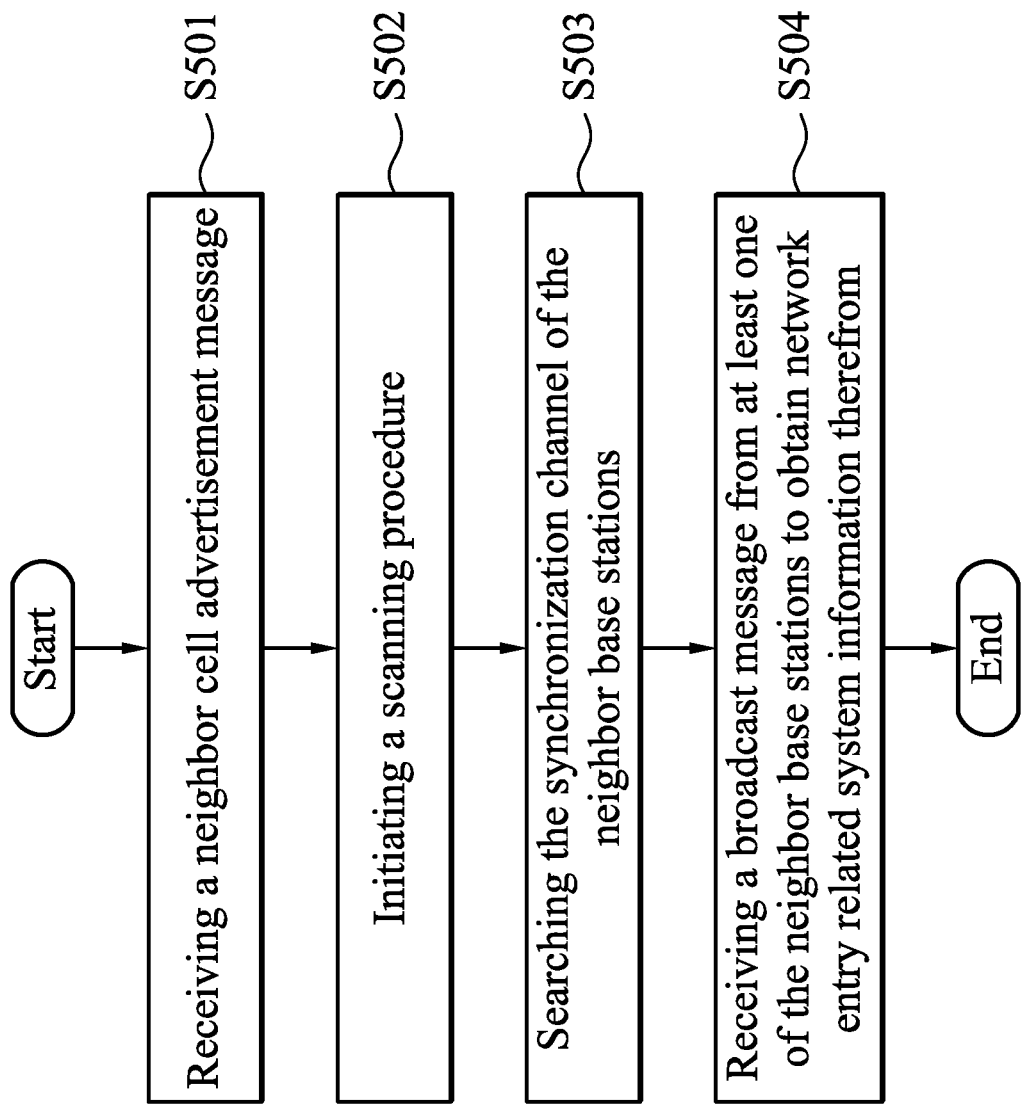
FIG. 5 shows a flow chart of a scanning procedure according to an embodiment of the invention.

FIG. 5 shows a flow chart of a scanning procedure according to an embodiment of the invention. As previously described, upon receiving the broadcasted neighbor cell advertisement message (NBR_ADV) from the serving base station via the radio transceiver module 132 (Step S501), the information of the neighbor base stations may be obtained. When the processor 134 is aware that the signal power of the serving base station has dropped below a first predetermined threshold (as show in FIG. 4), the processor 134 may initiate a scanning procedure (Step S502). In the scanning procedure, the processor 134 may first search for the synchronization channel (SCH) of the neighbor base stations according to the SCH information (for example, the preamble index information) carried in the neighbor cell advertisement message (NBR_ADV), and measure the downlink SCH signal power of the corresponding neighbor base stations (Step S503). The processor 134 may further receive another broadcast message from the scanned neighbor base stations and decode the broadcast message to obtain network entry related system information therefrom (Step S504).

Figure 6:
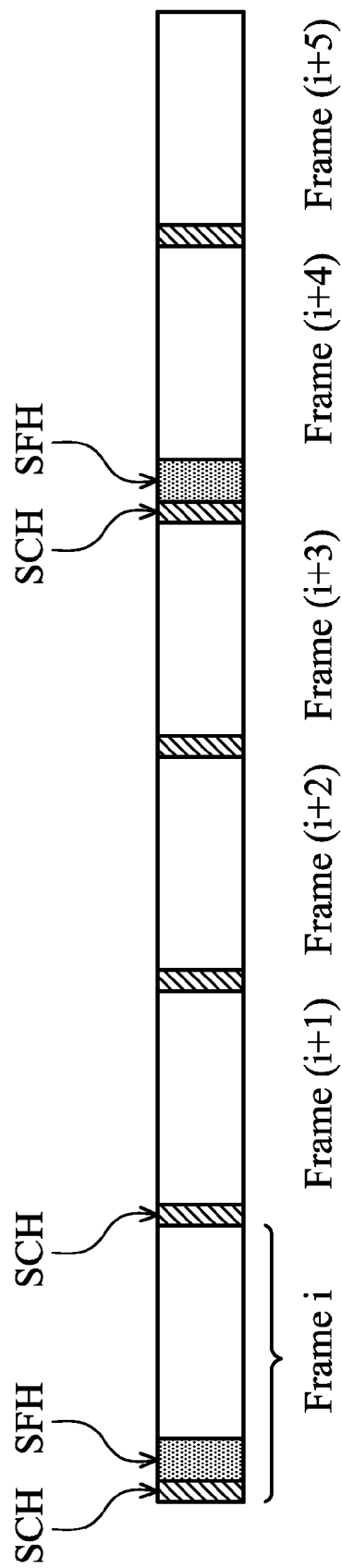
FIG. 6 shows a schematic view of the transmission schedule of the SCH and the SFH bursts according to an embodiment of the invention.

FIG. 6 shows a schematic view of the transmission schedule of the SCH and SFH (super frame header) bursts according to an exemplary embodiment of the invention, IEEE802.16m. According to the embodiment of the invention, the base station may broadcast the corresponding network entry related system information in the super frame header (SFH) message. Further, measuring the downlink signal power may be taken by sliding the measurement window over several frames so as to mitigate a sudden power fluctuation. It is noted that Step S504 shown in FIG. 5 may be skipped when the measured SCH power is determined to be insufficient. It is also noted that since the synchronization channel (SCH) and the broadcast message are transmitted in a time division multiplexing (TDM) scheme, decoding the broadcast message may be performed after the signal power of the SCH is measured or at the same time as the signal power of the SCH is being measured.

According to an embodiment of the invention, the neighbor base stations may be prioritized and scanned in a preferred order according to their properties. Therefore, the communication apparatus may not have to scan all of the neighbor base station, and the preferred neighbor base stations may be scanned prior to others. According to an embodiment of the invention, the scanning candidates may be determined and prioritized according to cell coverage of the neighbor base stations. As an example, for a high mobility communication apparatus, a neighbor base station with wider cell coverage may have higher priority and be scanned first. On the other hand, for a low mobility communication apparatus, a neighbor base station with smaller cell coverage may have higher priority. The mobility of a communication apparatus may be determined according to some predetermined algorithms. As an example, the mobility of a communication apparatus may be determined according to the handover times over a predetermined time interval. In the embodiment of the invention, the cell coverage information may be carried in the neighbor cell advertisement message (NBR_ADV) via a corresponding parameter, and the communication apparatus may obtain the information therefrom. For example, the cell coverage may be represented by a predetermined value, wherein larger value represents larger cell coverage. For another example, the parameter may be set as a macro, micro, femto, pico, and so on to represent different cell coverage.

According to another embodiment of the invention, the scanning candidates of the neighbor base stations may also be prioritized according to network loadings. As an example, the neighbor base station with a light loading may have higher priority and be scanned first. In the embodiment of the invention, the network loading information may be carried in the neighbor cell advertisement message (NBR_ADV) via a corresponding parameter, such as a "UL loading factor", and the communication apparatus may obtain the information therefrom.

According to yet another embodiment of the invention, the scanning candidates of the neighbor base stations may also be prioritized according to capabilities of the communication apparatus and/or the neighbor base stations. As an example, the communication apparatus with IEEE 802.16m capabilities may prefer a base station supporting IEEE 802.16m over the base stations unable to support IEEE 802.16m, and give a higher priority to the base station supporting IEEE 802.16m so as to scan the base station first. The capability information may be obtained according to a Medium Access Control (MAC) layer version number of the neighbor base stations. As another example, the communication apparatus with multi-carrier capability may prefer a base station also supporting multi-carrier transmission, and give a higher priority to the base station so as to scan the base station first. In the embodiment of the invention, the capability information of the neighbor cell may also be carried in the neighbor cell advertisement message (NBR_ADV).

According to yet another embodiment of the invention, the scanning candidates of the neighbor base stations may also be prioritized according to locations of the neighbor base stations. As an example, the communication apparatus may prefer a nearby base station and give higher priority to the base station so as to scan the base station first. The location information may be obtained according to the longitude and the latitude of the neighbor base stations. In the embodiment of the invention, the neighbor cell location information may also be carried in a location based advertisement message (LBS_ADV) by serving the base station.

According to yet another embodiment of the invention, the scanning candidates of the neighbor base stations may also be prioritized according to historical data of the communication apparatus. As an example, the scanning of the neighbor base stations may be prioritized according to historical handover times of the communication apparatus corresponding to the neighbor base stations. Thus, a neighbor base station that the communication apparatus frequently visits may have a higher priority. In the embodiment of the invention, the historical data may be recorded by both the base stations and the communication apparatus.

It should be noted that according to different embodiments of the invention, both the communication apparatus 100 and servicing base station ma be capable of prioritizing the scanning candidates as described above. Thus, the invention should not be limited thereto.

According to another aspect of the invention, to aid the prioritization of scanning candidates, the serving base station may categorize the neighbor base stations according to their cell types, and sort the information of the neighbor base stations according to the categories before carrying in the neighbor cell advertisement message. According to the embodiments of the invention, the cell types may be the cell coverage, MAC layer versions, multi-carrier capabilities and/or one or more physical parameters (for example, the system bandwidth, Fast Fourier Transform (FFT) size, cyclic prefix length . . . etc.) of the neighbor base stations.

As an example, the serving base station may categorize the neighbor base stations according to their cell coverage. Information of the neighbor base stations belonging to the same category, such as a macro, micro or a femto cell category, may be gathered together and carried in the neighbor cell advertisement message (NBR_ADV) sequentially. Information of the neighbor base stations belonging to other categories may further be appended to the tail of a previous category so as to be carried in a sorted order. In this way, the cell information of the neighbor base stations having the same cell type may be gathered together. Therefore, the communication apparatus may more efficiently perform cell prioritization as previously described upon receiving the sorted cell information.

According to another embodiment of the invention, the serving base station may carry only the delta information (that is, the difference information) of the neighbor base stations belonging to a same category. As another example, when preparing the cell information of the neighbor base stations belonging to a category, the serving base station may first carry the cell information of a first neighbor base station, and then carry difference information of rest of the neighbor base stations belonging to the same category in the neighbor cell advertisement message. The difference information may comprise a portion of cell information of the rest neighbor base stations that is different from the corresponding cell information of the first neighbor base station. Cell information of the neighbor base stations in other categories may also be prepared in the similar manner, and appended to the tail of a previous category so as to be carried in the neighbor cell advertisement message according to the sorted order.

According to the embodiment of the invention, since the network entry related system information may be obtained from the super frame header (SFH) after the SCH burst as shown in FIG. 6, the neighbor cell advertisement message (NBR_ADV) may carry a minimum set of cell information of the neighbor base stations. The minimum set of cell information may comprise the parameters required by the communication apparatus in the scanning procedure. As an example, the cell information parameters may comprise the base station identifier (BSID), SCH information, transmission power, network loading, and other configuration parameters (such as ranging configuration for seamless handover) of a corresponding neighbor base station. As given in FIG. 5, the communication apparatus may obtain the other necessary system information during the scanning operation. In this way, the broadcast overhead may be greatly reduced and mitigate the effect of system information updating during MS scanning.

In addition, according to an embodiment of the invention, the neighbor cell advertisement message (NBR_ADV) may further be segmented into a plurality of sub-advertisement messages. Since the cell information carried in the neighbor cell advertisement message (NBR_ADV) has been sorted according to their categories, each sub-advertisement message may carry the information of the neighbor base stations belonging to one or more categories. Therefore, the communication apparatus may begin the scanning procedure immediately after receiving at least one sub-advertisement message. In some embodiments, a BS may be labeled by a unique index corresponding to the cell type in each sub-advertisement message. After receiving the sub-advertisement message, each base station under scanning may be identified by its index number, not base station identification number (BSID). BSID is a unique ID for a specific cell within a whole network. This is able to improve the system efficiency and throughput since the length of index number is much shorter than the length of the BSID.

Figure 7:
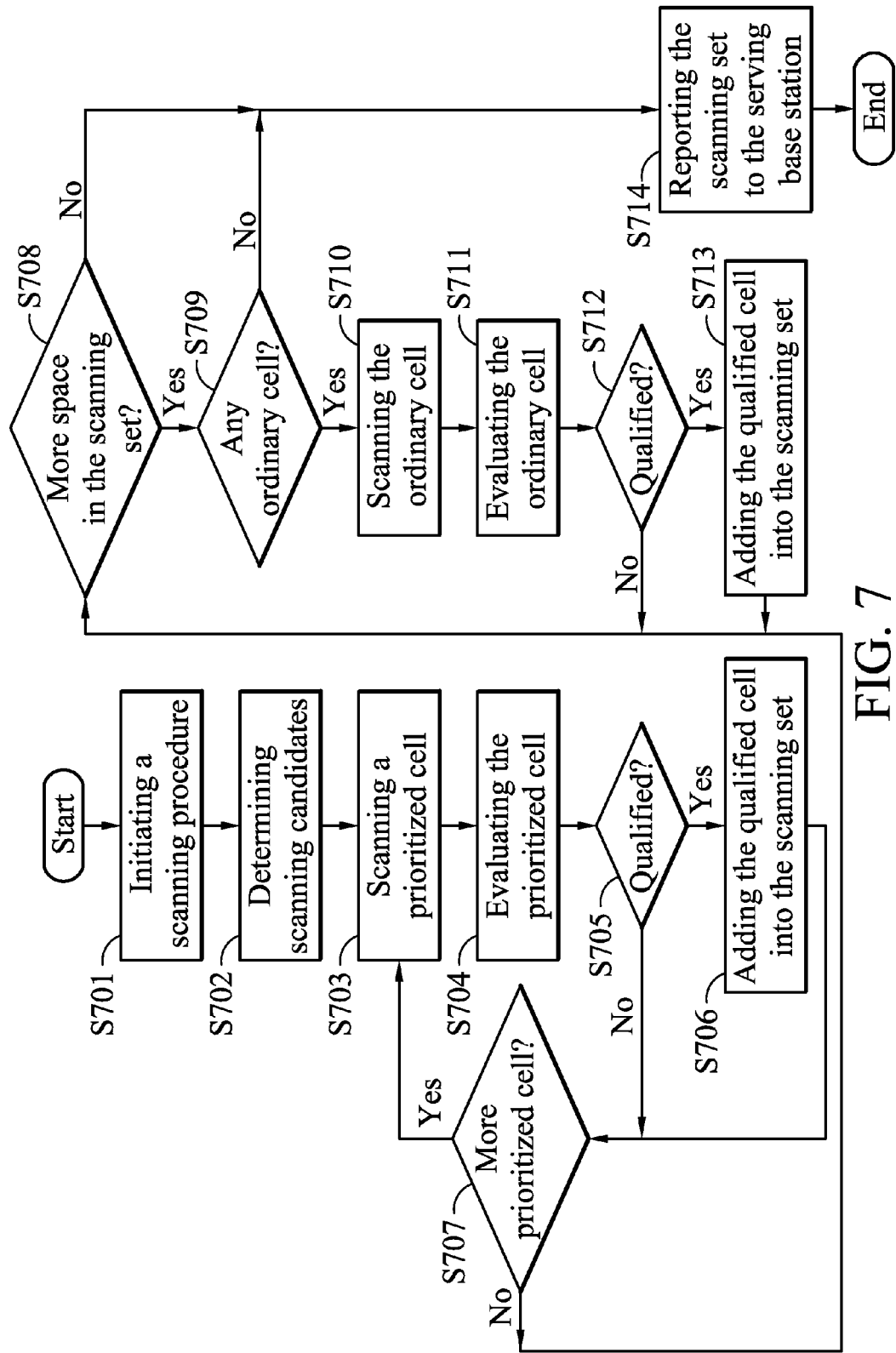
FIG. 7 shows a flow chart of a method for scanning neighbor base stations according to an embodiment of the invention.

FIG. 7 shows a flow chart of a method for scanning power of neighbor base stations according to an embodiment of the invention. In the embodiment, an autonomous scan is introduced. In the autonomous scan, the communication apparatus 100 may initiate the scanning procedure without being instructed by the serving base station (Step S701). The processor 134 of the communication apparatus 100 may first determine one or more scanning candidates according to the cell information carried in the neighbor cell advertisement message (NBR_ADV) (Step S702). As previously described, the cell information may be sorted by the serving base station according to the cell types, and carried in the neighbor cell advertisement message (NBR_ADV). The processor 134 may prioritize the neighbor base stations according to their properties as previously described, and determine the scanning candidates by selecting the preferred neighbor base stations (hereinafter called the prioritized cells). Next, the processor 134 may scan a prioritized cell (Step S703), evaluate the prioritized cell (Step S704), and determine whether the prioritized cell is qualified according to predetermined criteria (Step S705). When the prioritized cell is determined to have been qualified, the processor 134 may add the qualified cell into a scanning set (Step S706). The scanning set may be a set comprising of one or more the neighbor base stations to scan to be scanned by the communication apparatus 100. When the prioritized cell is determined to not be qualified, the processor 134 may further determine whether there is any prioritized cell that has not been evaluated (Step S707), and the flow may go back to step S703 to scan and evaluate the prioritized cell(s).

After evaluating all of the prioritized cells, the processor 134 may further determine whether there is more space in the scanning set (Step S708). If there is more space in the scanning set, the processor 134 may further determine whether there is any ordinary cell (neighbor base stations with lower priority) that has not been evaluated (Step S709). If so, the processor 134 may scan the ordinary cell (Step S710), evaluate the ordinary cell (Step S711), and determine whether the ordinary cell is qualified according to the predetermined criteria (Step S712). When the ordinary cell is determined to have been qualified, the processor 134 may add the qualified cell into the scanning set (Step S713). When the ordinary cell is determined to not be qualified, the processor 134 may further determine whether there is more space in the scanning set and whether there is any ordinary cell that has not been evaluated (Steps S708 and S709), and the flow may go back to step S710 to scan and evaluate the other ordinary cell(s). Finally, the processor 134 may report the scanning set to the serving base station (Step S714). According to the embodiment of the invention, periodic scan may further be triggered after the scanning set has been determined. After the scanning procedure, the processor 134 may obtain a measurement result and determine whether to trigger a handover procedure according to the measurement result. In one embodiment of the invention, the serving base station may determine the target base station based on the measurement report and instruct the communication apparatus to conduct handover procedure. The network entry related system information for the possible handover procedure may be obtained from a broadcast message (as an example, the super frame header as shown in FIG. 6) of the target base station.

Figure 8:
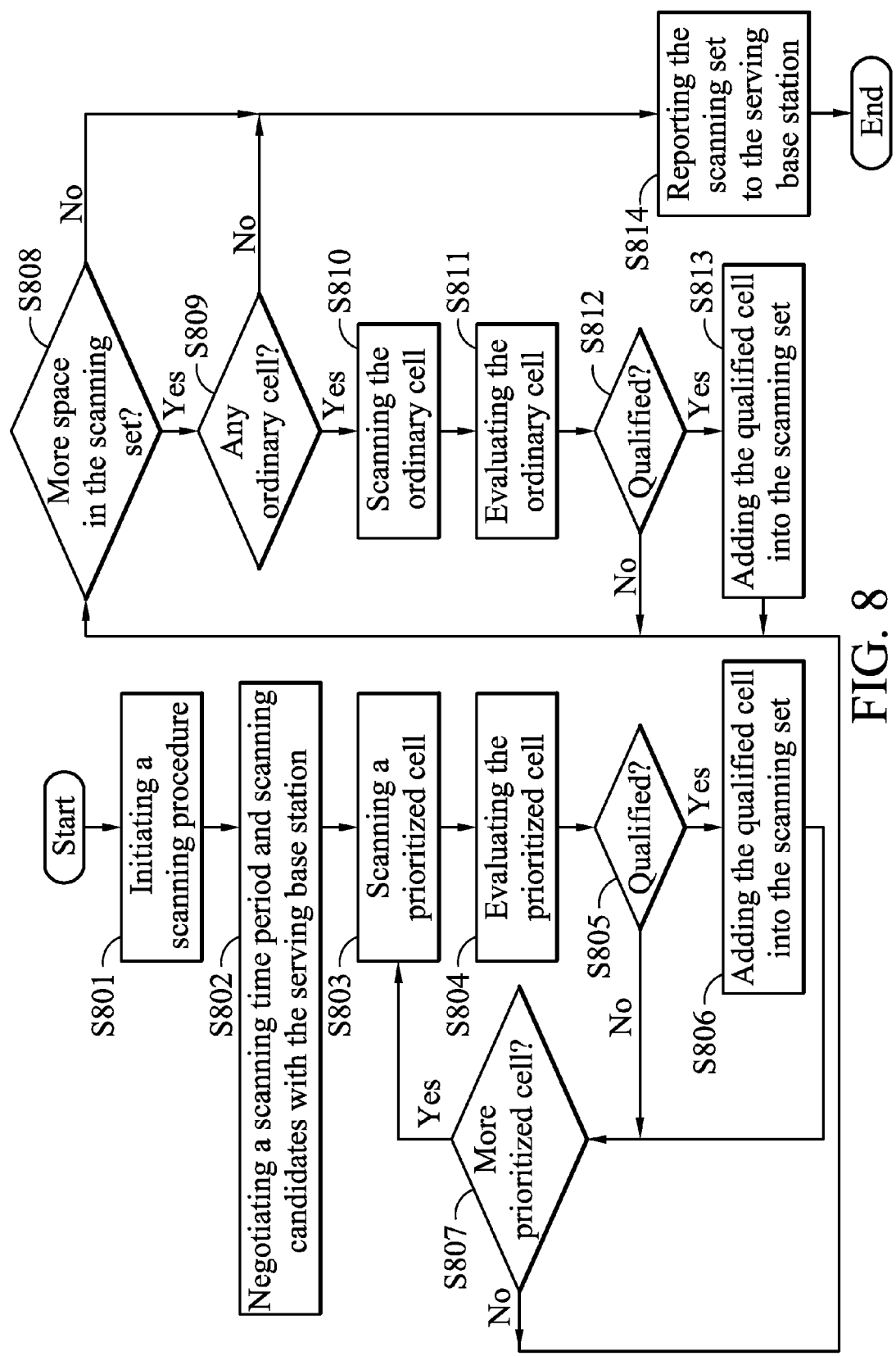
FIG. 8 shows a flow chart of a method for scanning neighbor base stations according to another embodiment of the invention.

FIG. 8 shows a flow chart of a method for scanning power of neighbor base stations according to an embodiment of the invention. In the embodiment, a solicited scan is introduced. For the solicited scan, the communication apparatus 100 may initiate the scanning procedure (Step S801) and negotiate a scanning time period and scanning candidates with the serving base station (Step S802). Negotiation may be triggered by sending a scan request message (SCN_REQ) to the serving base station. In the embodiment, the serving base station may determine the scanning candidates and prioritize the scanning candidates according to their properties as previously described. The serving base station may carry the list of recommend scanning candidates in a scan response message (SCN_RSP). According to the embodiments of the invention, the scanning candidates listed in the scan response message (SCN_RSP) may be categorized according to their cell types as previously described, sorted according to their priorities, or categorized into prioritized cells and ordinary cells according to their priorities. After receiving the list of scanning candidates (as an example, the prioritized cells and ordinary cells), the processor 134 may scan a prioritized cell (Step S803), evaluate the prioritized cell (Step S804), and determine whether the prioritized cell is qualified according to predetermined criteria (Step S805). As previously described, the cell information of the neighbor base stations required in the scanning procedure may be obtained from in the neighbor cell advertisement message (NBR_ADV). When the prioritized cell is determined to have been qualified, the processor 134 may add the qualified cell into a scanning set (Step S806). The scanning set may be a set comprising one or more of the neighbor base stations to be scanned by the communication apparatus 100. When the prioritized cell is determined to not be qualified, the processor 134 may further determine whether there is any prioritized cell that has not been evaluated (Step S807), and the flow may go back to step S803 to scan and evaluate the prioritized cell(s).

After evaluating all of the prioritized cells, the processor 134 may further determine whether there is more space in the scanning set (Step S808). If there is more space in the scanning set, the processor 134 may further determine whether there is any ordinary cell (neighbor base stations with lower priority) that has not been evaluated (Step S809). If so, the processor 134 may scan the ordinary cell (Step S810), evaluate the ordinary cell (Step S811), and determine whether the ordinary cell is qualified according to the predetermined criteria (Step S812). When the ordinary cell is determined to have been qualified, the processor 134 may add the qualified cell into the scanning set (Step S813). When the ordinary cell is determined to not be qualified, the processor 134 may further determine whether there is more space in the scanning set and whether there is any other ordinary cell that has not been evaluated (Steps S808 and S809), and the flow may go back to step S810 to scan and evaluate the ordinary cell(s). Finally, the processor 134 may report the scanning set to the serving base station (Step S814). According to the embodiment of the invention, periodic scan may further be triggered after the scanning set has been determined. After the scanning procedure, the processor 134 may obtain a measurement result and determine whether to trigger a handover procedure according to the measurement result. In one embodiment of the invention, the serving base station may determine the target base station based on the measurement report and instruct the communication apparatus to conduct handover procedure. The network entry related system information for the possible handover procedure may be obtained from a broadcast message (as an example, the super frame header as shown in FIG. 6) of the target base station.

Figure 9:
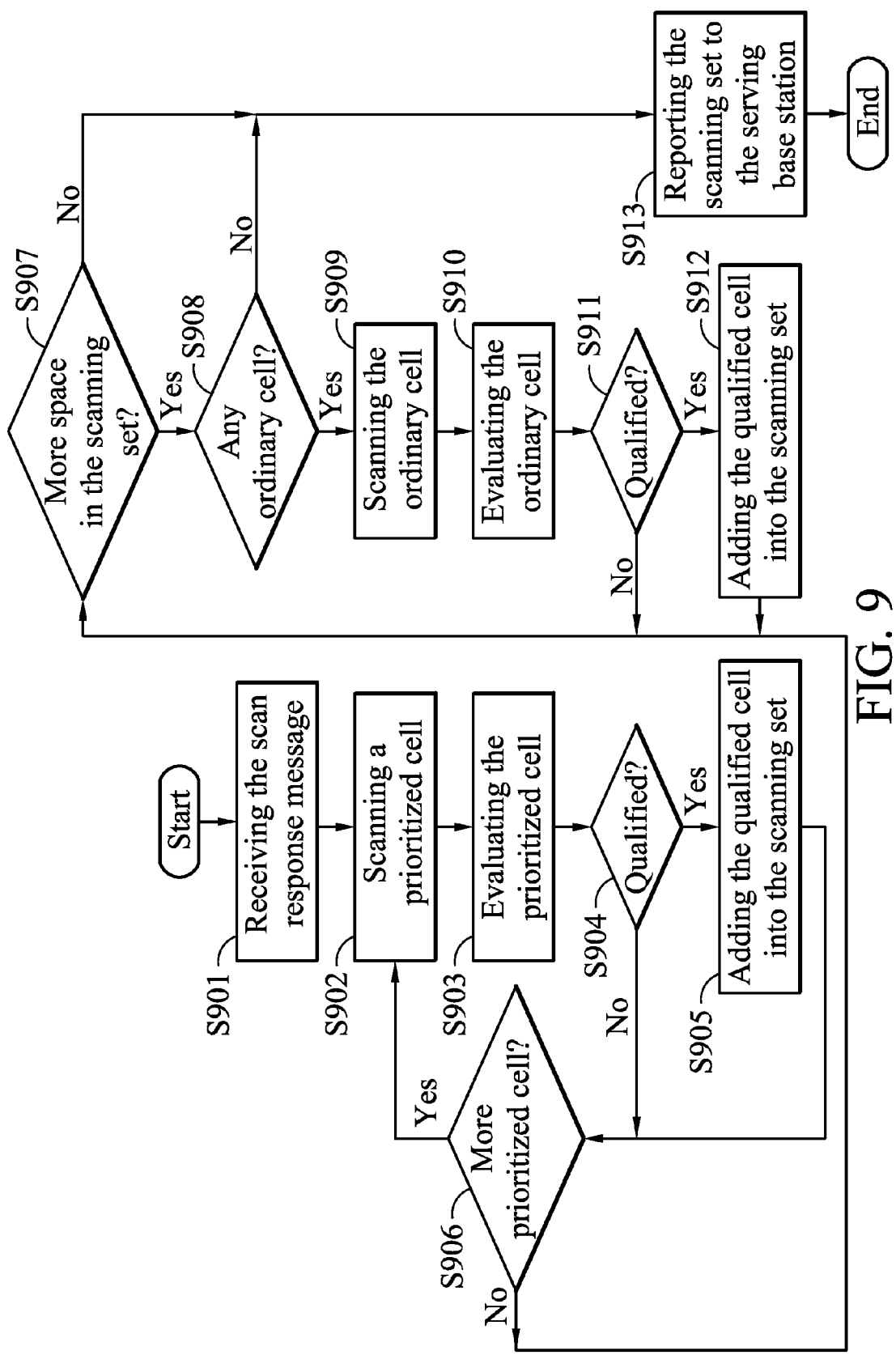
FIG. 9 shows a flow chart of a method for scanning neighbor base stations according to another embodiment of the invention.

FIG. 9 shows a flow chart of a method for scanning power of neighbor base stations according to an embodiment of the invention. In the embodiment, an unsolicited scan is introduced. For the unsolicited scan, the serving base station may trigger the communication apparatus 100 to scan the neighbor base stations without receiving scan request message. In the embodiment, the serving base station may determine the scanning candidates and prioritize the scanning candidates according to their properties as previously described. The serving base station may carry the list of recommend scanning candidates in a scan response message (SCN_RSP). According to the embodiments of the invention, the scanning candidates listed in the scan response message (SCN_RSP) may be categorized according to their cell types as previously described, sorted according to their priorities, or categorized into prioritized cells and ordinary cells according to their priorities. After receiving the scan response message in an unsolicited manner (Step S901), the processor 134 may scan a prioritized cell (Step S902), evaluate the prioritized cell (Step S903), and determine whether the prioritized cell is qualified according to predetermined criteria (Step S904). As previously described, the cell information of the neighbor base stations required in the scanning procedure may be obtained from the neighbor cell advertisement message (NBR_ADV). When the prioritized cell is determined to have been qualified, the processor 134 may add the qualified cell into a scanning set (Step S905). The scanning set may be a set comprising one or more scanning candidates to be scanned by the communication apparatus 100. When the prioritized cell is determined to not be qualified, the processor 134 may further determine whether there is any prioritized cell that has not been evaluated (Step S906), and the flow may go back to step S902 to scan and evaluate the prioritized cell(s).

After evaluating all of the prioritized cells, the processor 134 may further determine whether there is more space in the scanning set (Step S907). If there is more space in the scanning set, the processor 134 may further determine whether there is any ordinary cell (neighbor base stations with lower priority) that has not been evaluated (Step S908). If so, the processor 134 may scan the ordinary cell (Step S909), evaluate the ordinary cell (Step S910), and determine whether the ordinary cell is qualified according to the predetermined criteria (Step S911). When the ordinary cell is determined to have been qualified, the processor 134 may add the qualified cell into the scanning set (Step S912). When the ordinary cell is determined to not be qualified, the processor 134 may further determine there is more space in the scanning set and whether there is any ordinary cell that has not been evaluated (Steps S907 and S908), and the flow may go back to step S909 to scan and evaluate the ordinary cell(s). Finally, the processor 134 may report the scanning set to the serving base station (Step S913). According to the embodiment of the invention, periodic scan may further be triggered after the scanning set has been determined. After the scanning procedure, the processor 134 may obtain a measurement result and determine whether to trigger a handover procedure according to the measurement result. In one embodiment of the invention, the serving base station may determine the target base station based on the measurement report and instruct the communication apparatus to conduct handover procedure. The network entry related system information for the possible handover procedure may be obtained from a broadcast message (as an example, the super frame header as shown in FIG. 6) of the target base station.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus, comprising:
a radio transceiver module; and
a processor, responsive to a signal power of a serving base station falling below a first predetermined threshold, receiving a neighbor cell message from the serving base station and determine a measurement result based on the information carried in the received neighbor cell message,
wherein the neighbor base stations are prioritized by the processor in a prioritized order, the prioritized order being determined based on properties of neighboring cell base stations, wherein the neighbor base stations are categorized as at least one of prioritized cells and ordinary cells according to cell types, wherein a scanning set of the neighbor base stations is formed of qualified prioritized cells and reported to the serving base station according to the prioritized order and responsive to at least one of: no space remaining in the scanning set and all ordinary cells being evaluated, wherein the scanning set is scanned, wherein the cell types comprise at least cell coverage, and wherein the processor initiates a handover procedure responsive to the signal power falling below a second predetermined threshold.

2. The communication apparatus as claimed in claim 1, wherein the processor further receives a broadcast message from at least one of the neighbor base stations to obtain network entry related system information therefrom.

3. The communication apparatus as claimed in claim 2, wherein the processor further conducts a handover procedure with the serving base station to one of the neighbor base stations according to the measurement result and the obtained network entry related system information.

4. The communication apparatus as claimed in claim 1, wherein the scanning of the neighbor base stations is prioritized according to network loadings of the neighbor base stations.

5. The communication apparatus as claimed in claim 1, wherein the scanning of the neighbor base stations is prioritized according to locations of the neighbor base stations.

6. The communication apparatus as claimed in claim 1, wherein the scanning of the neighbor base stations is prioritized according to historical handover records of the communication apparatus corresponding to the neighbor base stations.

7. The communication apparatus as claimed in claim 1, wherein the cell types further comprise at least one of: Medium Access Control (MAC) layer versions, or one or more physical parameters of the neighbor base stations.

8. The communication apparatus as claimed in claim 1, wherein the neighbor cell message is segmented into a plurality of sub-messages, each sub-advertisement message carries information regarding the neighbor base stations belonging to one or more categories, and wherein the processor scans the neighbor base stations after receiving at least one sub-message.

9. A method for scanning neighbor base stations of a communication apparatus, comprising:
responsive to a signal power of a serving base station falling below a first predetermined threshold, performing the steps of:
obtaining information of a plurality of neighbor base stations;
categorizing neighbor base stations as at least one of prioritized cells and ordinary cells;
reporting a scanning set comprising qualified prioritized cells to the serving base station responsive to one of: no space remaining in the scanning set and all ordinary cells being evaluated, wherein the candidates are prioritized in a preferred order according to properties of the neighbor base stations;
scanning the candidates in the scanning set in the preferred order to obtain a measurement result;
wherein categorizing the neighbor base stations in the scanning set is performed according to cell types of the neighbor base stations, wherein the cell types comprise at least cell coverage;
sorting the information of the neighbor base stations according to the categories of the neighbor base stations;
carrying the sorted information in a neighbor cell message; and
initiating a handover procedure responsive to the signal power falling below a second predetermined threshold.

10. The method as claimed in claim 9, further comprising:
receiving a broadcast message from at least one of the scanned candidates to obtain network entry related system information therefrom.

11. The method as claimed in claim 10, further comprising:
transferring a communication service of the communication apparatus from a serving base station to one of the candidates according to the measurement result and the obtained network entry related system information.

12. The method as claimed in claim 9, wherein the candidates are prioritized according to network loadings.

13. The method as claimed in claim 9, wherein the candidates are prioritized according to locations.

14. The method as claimed in claim 9, wherein the candidates are prioritized according to times of historical handover of the communication apparatus corresponding to the candidates.

15. The method as claimed in claim 9, wherein the cell types further comprise at least one of: Medium Access Control (MAC) layer versions, or one or more physical parameters of the neighbor base stations.

16. The method as claimed in claim 9, further comprising:
segmenting the neighbor cell message into a plurality of sub-messages, wherein each sub-message carries information of the neighbor base stations belonging to one or more categories; and
determining the candidates after receiving at least one sub-message.

17. The method as claimed in claim 9, wherein the step of carrying the sorted information in the neighbor cell message further comprises:
carrying the information of a first neighbor base station belonging to one category in the neighbor cell message; and
carrying difference information of rest of the neighbor base stations belonging the same category in the neighbor cell message, wherein the difference information comprises the information that is different from the information of the first neighbor base station.

18. A communication apparatus, comprising:
a radio transceiver module; and
a processor, responsive to a signal power of a serving base station falling below a first predetermined threshold, receiving a neighbor cell message from the serving base station and determine a measurement result based on the information carried in the received neighbor cell message,
wherein the neighbor base stations are prioritized by the processor in a prioritized order, the prioritized order being determined based on properties of neighboring cell base stations, wherein the neighbor base stations are categorized as at least one of prioritized cells and lower priority cells according to cell types;
wherein a scanning set of the neighbor base stations is formed of qualified prioritized cells and reported to the serving base station according to the prioritized order responsive to one of: no space remaining in the scanning set and all lower priority cells being evaluated, wherein the scanning set is scanned, wherein the scanning of the neighbor base stations is prioritized according to at least cell coverage of the neighbor base stations; and
wherein the processor initiates a handover procedure responsive to the signal power falling below a second predetermined threshold.

19. A method for scanning neighbor base stations of a communication apparatus, comprising:
responsive to a signal power of a serving base station falling below a first predetermined threshold, performing the steps of:
obtaining information of a plurality of neighbor base stations;
categorizing neighbor base stations as at least one of prioritized cells and lower priority cells;
reporting a scanning set comprising qualified prioritized cells to the serving base station responsive to one of: no space remaining in the scanning set and all lower priority cells being evaluated, wherein the candidates are prioritized in a preferred order according to properties of the neighbor base stations; and
scanning the candidates in the scanning set in the preferred order to obtain a measurement result;
wherein the candidates are prioritized according to at least cell coverage of the neighbor base stations; and
initiating a handover procedure responsive to the signal power falling below a second predetermined threshold.

* * * * *